Figure 1:
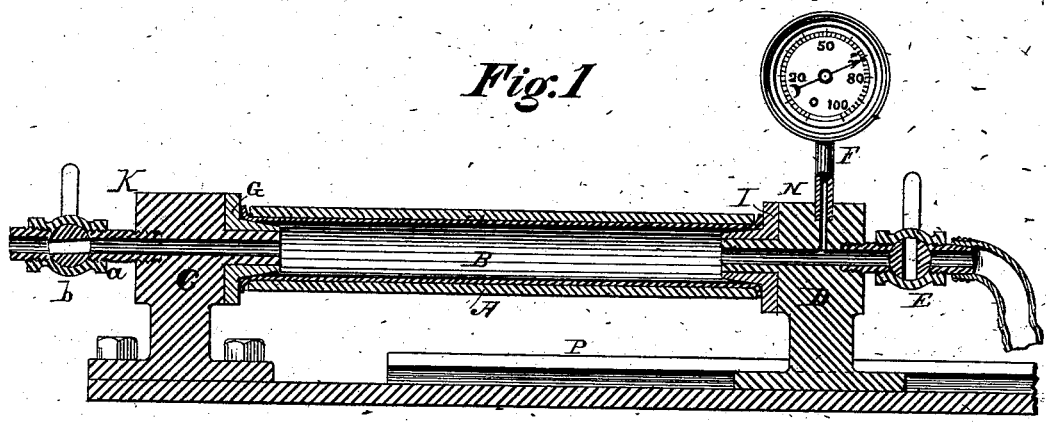

(No Model.)

M. C. LEFFERTS.
PROCESS OF AND APPARATUS FOR LINING HOLLOW ARTICLES WITH CELLULOID, &c.

No. 281,529. Patented July 17, 1883.

Witnesses:
John Everding.
Herman Gustow.

Inventor:
Marshall C. Lefferts,
By Chas. C. Gill
Attorney.

UNITED STATES PATENT OFFICE.

MARSHALL C. LEFFERTS, OF NEW YORK, N. Y., ASSIGNOR TO THE CELLULOID MANUFACTURING COMPANY, OF SAME PLACE.

PROCESS OF AND APPARATUS FOR LINING HOLLOW ARTICLES WITH CELLULOID, &c.

SPECIFICATION forming part of Letters Patent No. 281,529, dated July 17, 1883.

Application filed May 10, 1883. (No model.)

*To all whom it may concern:*

Be it known that I, MARSHALL C. LEFFERTS, a citizen of the United States, and a resident of New York, in the county of New York and State of New York, have invented a certain new and useful Process of and Apparatus for Lining Hollow Articles with Celluloid and other Plastic Material, of which the following is a specification.

The invention has relation to an improved process and apparatus for lining and coating the inside of pipes, tubes, and other hollow articles with celluloid or other plastic material.

The distinctive characteristics of my process consists in, first, inserting a tube of the celluloid or other plastic material into the article to be lined, and then, by means of steam, water, or other internal pressure, causing the tube of plastic material to expand against and closely adhere to the inner superficies of the article.

The invention will admit of various modifications, which will suggest themselves from the description hereinafter presented, without a more specific explanation.

Heretofore in the manufacture of pipes it has been customary, in order to prevent the liquid from acting upon the inner metallic superficies, to line the pipes with various substances, among which may be mentioned glass and tin; but it is well known, however, that the glass will shatter when the pipe is jarred, and that the pipe lined with glass cannot be bent without breaking the lining. Tin-lined pipes are too expensive for general use, and are not desirable for various reasons.

The object of the present invention is to furnish a means for lining pipes which will permit of the pipe being bent without injuring the lining, and which will be comparatively inexpensive, and can easily be kept clean, and which will not be affected by, nor will it injuriously affect, water, beer, ale, vinegar, acids, and other materials passing through it.

The invention is alike applicable to articles made from materials other than metal.

In practicing my invention, when lining a pipe, for illustration, I first prepare a tube of celluloid or other plastic material, according to the well-known means, of such size that it will readily pass into the pipe, the ends of the tube being afterward bent outward over the edges of the pipe, in order that the agent used to effect the adherence of the tube will not pass between it and the pipe. Steam or other heated fluid is then passed through the tube inclosed by the pipe until the celluloid has become plastic or softened, at which time the outlet is closed, and the supply of steam or other fluid continued under pressure, the effect of which is to expand the celluloid tube and cause it to adhere securely against the inner superficies of the pipe. After this step in the process the pipe is cooled by sprinkling water upon it, by immersion in a water bath, or by the passage through it of a cooling agent, thereby "setting" the celluloid and completing the operation.

Figure 2:
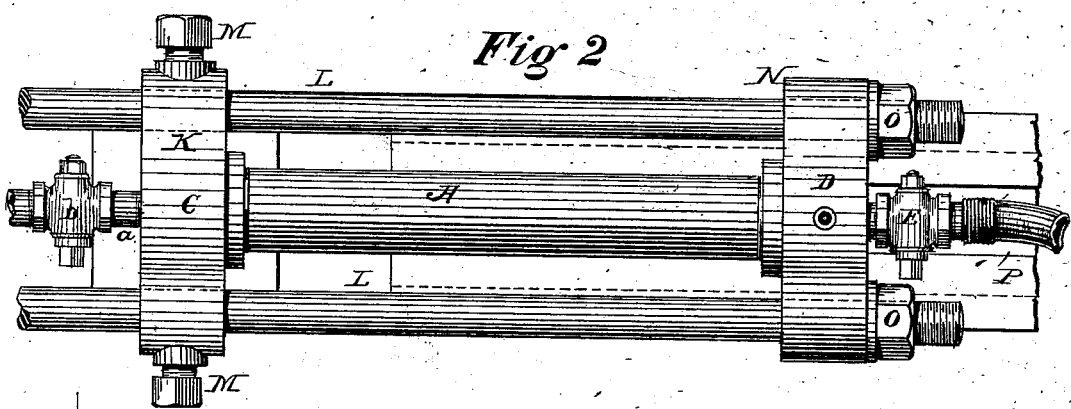
Figure 3:
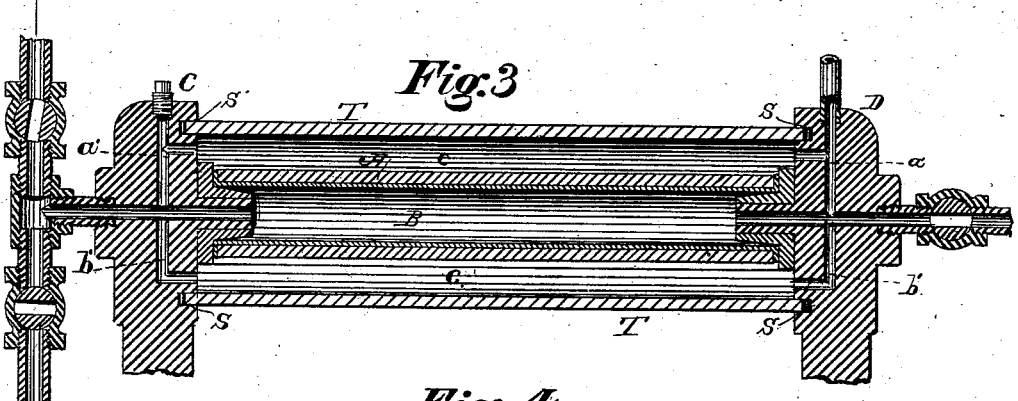
Figure 4:
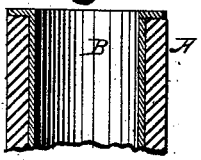

The invention will be more clearly understood by reference to the accompanying drawings, in which I embody the same applied to the lining of pipes or tubes, Figure 1 being a central vertical section of an apparatus for lining a single pipe, Fig. 2 being a top view of same; Fig. 3, a central vertical section of an apparatus adapted to lining a glass tube or article of a fragile nature; and Fig. 4 is a detached sectional view of one end of the lined pipe.

In the drawings, referring to Fig. 1, A denotes the pipe; B, the tube, of celluloid or other plastic material; C, the inlet-nozzle to the tube B for steam or water; and D, the outer nozzle, which will be usually supplied with a valve, E, and a gage, F. The inlet-nozzle C will be connected with or form part of an appropriate supply, *a*, having a cock, *b*, and will be provided upon its inner end with a contracted mouth, which enters the tube B, either alone or after having the thimble G placed upon it. The thimble G has beveled sides, which adapt it for pipes of different sizes, and it is detachable, so that a thimble corresponding in size with the bore of the pipe to be lined may be applied over the mouth of the nozzle C. The outlet-nozzle D will also be provided with a thimble, I, and a contracted mouth, similar to and for the same purpose as the thimble supplied to the nozzle C. The cock or valve E will be of any convenient construction, and is applied merely to cut off the passage of the heating or cooling agent through the nozzle D. The gage F will be the ordinary steam-gage, or it may be of any approved construction, and its purpose is to indicate the amount of pressure within the pipe. Unless a gage, F, is employed, the pressure within the pipe might become sufficiently great to burst it, especially if the pipe is of thin metal or of glass. In the drawings I illustrate the nozzle C forming part of the head K, which is secured to a base and is furnished in its opposite sides with apertures to receive and permit a sliding movement of the guide-rods L, set-screws M being provided to retain the rods L in a rigid position when desired. The right-hand end of the rods L pass through apertures in the head N, and are provided with nuts O, by which the said head N may be drawn nearer to the head K after the screws M have been set, the base of the head N being arranged in a guide, P, to permit its having a sliding movement.

The operation of the embodiment of the invention illustrated in Figs. 1 and 2 is as follows: The tube of celluloid or other plastic material having been inserted in the pipe A, the said pipe and tube are inserted over the contracted mouths of the nozzles C D and forced firmly in position by the movement of the head N, after which the steam or hot water is admitted to the tube B and allowed to pass through the same, the valve E being opened until the celluloid has become sufficiently softened, after which valve E is closed and the steam or hot water, under pressure, allowed to exert its force against the celluloid tube, which will thereby be caused to expand and adhere closely against the inner wall of the pipe A. After this the valve E is opened and the supply of steam or hot water cut off, and the cooling agent is admitted to the tube, which is thereby cooled and caused to "set" in the position given it by the steam or hot water. In lieu of using a stream of cold water for the purpose of setting the tube B, it is plain that a like effect may be secured by immersing the pipe in a cold-water bath or otherwise.

In lining a pipe of fragile material—such as glass—it will be necessary, in some instances, to apply a pressure upon the outside of the pipe to be lined of equal force with the internal pressure, thus preventing the latter pressure from fracturing the pipe; and for the purpose of more clearly explaining this part of my invention I show in Fig. 3 a means for accomplishing this result. In said figure, A denotes the tube, of glass, for example; B, the celluloid tube; C, the supply-nozzle; D, the outlet-nozzle, which has a cock or valve and a gage, such as those above described. The nozzle C will also be connected with a supply for steam or hot water or cold water. The nozzles C D will have the usual contracted mouths entering the tube B, and, in addition, will also be supplied with the groove S, in which will be placed the end of the inclosing-pipe T. In addition to the central passage through the nozzles C D illustrated in Fig. 1, I now employ branches, $a'\ b'$, connecting said central passage with the chamber $c$, formed between the outer pipe or casing, T, and the outer surface of the pipe A to be lined.

It will appear plain that when steam or water is admitted to the nozzle C it will pass both into the tube B and into the chamber $c$, and the pressure on the inside and outside of the pipe will balance each other, and thereby prevent the breakage of the pipe, while at the same time the internal pressure causes the tube B to closely adhere to the pipe A, in the manner hereinbefore described.

What I claim as my invention, and desire to secure by Letters Patent, is—

1. The process herein described of coating or lining the interior of pipes and other hollow articles, which consists in, first, inserting a tube or hollow form of celluloid or other plastic material into the pipe or other hollow article; and, second, softening the plastic material and causing it to expand against and adhere to the inner wall of the pipe or article by steam or heated fluid admitted to it under pressure, substantially as set forth.

2. The process hereinbefore described of coating or lining the inside of pipes or other hollow articles, which consists in, first, inserting a form of celluloid or other plastic material into the pipe or article; second, permitting the passage of steam or hot water through the tube for the purpose of softening it; and, third, cutting off the outlet for steam or water and permitting the supply of the same to continue, whereby the tube of celluloid or other plastic material is caused to expand against and adhere to the inner wall of the pipe or article, substantially as set forth.

3. The process hereinbefore described of coating or lining the inside of pipes and other hollow articles, which consists in, first, inserting a tube of celluloid or other plastic material into the pipe or article; second, permitting the passage of steam or hot water through the tube for the purpose of softening it; third, cutting off the outlet for steam or water, whereby the tube of plastic material is caused to expand and adhere to the inner wall of the pipe or article; and, fourth, cooling the pipe and causing the celluloid or plastic material to set, substantially as set forth.

4. A pipe or tube the inside of which is lined with a coating of celluloid or other plastic material, substantially as set forth.

5. The process here described of coating or lining hollow articles, which consists in, first, applying a form of celluloid or other plastic material to the article; second, softening the plastic material and causing it to adhere to the surface to be coated by a heating agent, the expansive force of the agent being exerted both against the plastic material and the article, whereby the latter, if of a fragile nature, will be preserved from breakage, substantially as set forth.

6. The apparatus for coating or lining hollow articles with plastic material, consisting of the inlet-nozzle connected with a supply and the outlet-nozzle connected with a delivery, both nozzles having mouths adapted to enter the opposite ends of the articles to be treated, substantially as set forth.

7. The apparatus for coating or lining hollow articles with plastic material, consisting of the inlet-nozzle and the outlet-nozzle, both having mouths adapted to enter the opposite ends of the article to be treated, and the latter being adjustable toward or from the former, substantially as set forth.

8. The apparatus for coating or lining hollow articles with plastic material, consisting of the inlet-nozzle and the outlet-nozzle, both having mouths adapted to enter the opposite ends of the article to be treated, and the latter being provided with a gage, and the passage through it controlled by a valve, substantially as set forth.

9. The apparatus for coating or lining hollow articles with plastic material, consisting of the inlet-nozzle and outlet-nozzle, the latter being movable and connected with the former by guide-rods L, substantially as set forth.

10. The inlet-nozzle having upon its contracted mouth the thimble G, and connected with a source of supply, in combination with the outlet-nozzle having upon its contracted mouth the thimble I, and provided with a gage and valve, substantially as set forth.

Signed at New York, in the county of New York and State of New York, this 7th day of May, A. D. 1883.

MARSHALL C. LEFFERTS.

Witnesses:
    CHAS. C. GILL,
    HERMAN GUSTOW.